US006664518B2

(12) United States Patent
Fristedt

(10) Patent No.: US 6,664,518 B2
(45) Date of Patent: Dec. 16, 2003

(54) DEVICE AND METHOD FOR HEATING A VEHICLE SEAT

(75) Inventor: Tommy Fristedt, Bottnaryd (SE)

(73) Assignee: Kongsberg Automotive AB (SE)

(*) Notice: Subject to any disclaimer, the term of this patent is extended or adjusted under 35 U.S.C. 154(b) by 0 days.

(21) Appl. No.: 10/252,291

(22) Filed: Sep. 23, 2002

(65) Prior Publication Data

US 2003/0024924 A1 Feb. 6, 2003

Related U.S. Application Data

(63) Continuation of application No. 09/646,029, filed as application No. PCT/SE99/00261 on Feb. 25, 1999.

(30) Foreign Application Priority Data

Mar. 13, 1998 (SE) .................................................. 9800845

(51) Int. Cl.$^7$ .............................. H05B 1/02; B60L 1/02
(52) U.S. Cl. ...................................... 219/497; 219/202
(58) Field of Search ................................ 219/490, 494, 219/497, 499, 501, 505, 507, 509, 202, 217

(56) References Cited

U.S. PATENT DOCUMENTS 4,411,385 A  10/1983  Lamkewitz
4,819,714 A   4/1989  Otsuka et al.
5,008,803 A   4/1991  Lida

FOREIGN PATENT DOCUMENTS

WO    WO 98/1798    1/1998

Primary Examiner—Sang Paik
(74) Attorney, Agent, or Firm—Lerner, David, Littenberg, Krumholz & Mentlik, LLP

(57) ABSTRACT

Apparatus is disclosed for heating a vehicle seat including a heating element for heating the vehicle seat, a temperature sensor for detecting the temperature created by the heating element, a control unit connected to the heating element and including a feed line for feeding a current to the heating element if the temperature measured by the temperature sensor is below a predetermined desired temperature, a communicator for receiving information from an external source, an external operating unit separated from the control unit, at least one functioning unit connected to the external operating unit, the external operating unit including programmed logic for generating information based on the state of the functional unit and a programmed function transmitting the information, and a transmission channel for transmitting the information from the external operating unit to the control unit whereby the control unit can be operated by means of that information. A method for heating a vehicle seat in this manner is also disclosed.

25 Claims, 3 Drawing Sheets

DEVICE AND METHOD FOR HEATING A VEHICLE SEAT

CROSS-REFERENCE TO RELATED APPLICATIONS

The present application is a continuation of U.S. patent application Ser. No. 09/646,029, filed Nov. 9, 2000, which application is the national phase of PCT International Application No. PCT/SE99/00261, filed Feb. 25, 1999, published in English on Sep. 16, 1999, the disclosures of which are incorporated by reference herein.

BACKGROUND OF THE INVENTION

The present invention relates to apparatus for heating a vehicle seat. More particularly, the present invention can be applied in motor vehicles, for heating electrically heatable seats for occupants in the vehicle. The present invention also relates to a method for heating such a vehicle seat.

For reasons of both comfort and safety, electrically heatable seats are used in modern vehicles. Both the driver's seat and the other seats in the vehicle can be arranged such that they can be heated by means of special heating elements in the form of electrically conducting wires which are placed in the shape of a heating coil in each seat. Such a heating element is normally placed in the cushion and the back-rest of each seat when manufacturing the seat. The heating element is also connected to a current feeding unit which delivers current. In this manner, the heating element can be heated to a suitable temperature.

A problem of previously known heating elements is caused by the desire for each seat to have a carefully adjusted temperature on its surface, i.e., on that surface which is in contact with the person sitting in the seat. For this purpose, the temperature of the heating element can be controlled by means of a temperature detector which is arranged in close proximity to the heating element, and which is connected to a central control unit. Using the temperature detector and the control unit, the current temperature can be detected. The control unit also comprises current feeding circuits which, for example, can be based on transistor or relay technology, for feeding a current to the heating element. In this way, the central control unit is arranged to feed a certain current to the heating element until a certain desired value for the temperature is reached. The setting of this desired value can be accomplished by means of fixed resistances or by means of an adjustable potentiometer, which is adjusted by a person travelling in the vehicle.

Using the above-described control method, current can be delivered to the heating element until the central control unit indicates that the desired value has been reached. When this happens, the control unit will interrupt feeding of the current. This causes the heating element to gradually cool down. When the heating element has cooled so that its temperature again falls below the desired value, current feeding to the heating element will be resumed. In this way, the temperature control will continue for as long as the system is operative.

Although previously known systems normally provide for reliable heating and temperature control for a vehicle seat, they may imply certain disadvantages. One such disadvantage relates to the fact that previously known systems demand unique temperature switches, a unique wiring and unique electronics units for all different variations of switches (for example On/Off, Off/Low/High, Off/Low/Medium, etc.) which may occur in different seat types and vehicle types. This results in extensive and complicated wiring arrangements between the control unit of the heating element and the various switches. Furthermore, the previously known systems require that the control unit of the heating element comprise particular hardware for different configurations of switches.

Another disadvantage related to previously known systems relates to the fact that the heating element is normally mounted in the vehicle seat during manufacturing thereof. In this regard, the heating element is adapted to a particular "standard seat," i.e., a seat type of a predetermined kind having a particular design, upholstery, etc. Consequently, the vehicle seat comprises a heating element for the purpose of heating the surface of the seat to a particular desired temperature. However, during assembly of the complete vehicle the manufacturer might choose to equip the vehicle seat in question with, for example, a completely different upholstery, for example a considerably thicker upholstery than that of the "standard" vehicle seat, i.e., an upholstery which differs from that for which the temperature control was originally intended. The temperature value which is detected by the temperature sensor will reach the set desired value when the heating element has reached the desired temperature, but since an abnormally thick upholstery is mounted on the seat, the temperature on the surface of the seat will be too low. This situation thus causes an undesired deviation during the temperature control.

One object of the present invention is thus to provide for improved heating of a seat in a vehicle, where the above-mentioned drawbacks have been eliminated.

SUMMARY OF THE INVENTION

In accordance with the present invention, apparatus has been devised for heating a vehicle seat comprising a heating element for heating the vehicle seat, a temperature sensor for detecting the temperature created by the heating element, a control unit connected to the heating element, the control unit comprising current feeding means for feeding a current to the heating element if the temperature measured by the temperature sensor is below a predetermined desired temperature, a communication member for receiving information from an external source, an external operating unit separated from the control unit, at least one functional member connected to the external operating unit, the external operating unit including programmed logic means for generating information based on the state of the at least one functional member, and programmed function means for transmitting the information, and a transmission channel for transmitting the information from the external operating unit to the control unit, whereby the control unit can be operated by means of the information. Preferably, the programmed logic means includes data relating to the design of the vehicle seat, and wherein the information comprises information relating to the predetermined desired temperature.

In accordance with one embodiment of the apparatus of the present invention, the communication member includes information transfer means for transferring additional information to the external operating unit, and the external operating unit includes additional information receiving means for receiving the additional information from the communication member and indication means for indicating receipt of the additional information and the condition of the at least one functional member. In a preferred embodiment, the additional information comprises information relating to the condition of the heating element and/or the control unit.

In accordance with one embodiment of the apparatus of the present invention, the additional information comprises a start pulse for initiating a periodical sequence during which the additional information is transferred.

In accordance with another embodiment of the apparatus of the present invention, the control unit comprises an oscillation circuit for transferring pulses having a predetermined periodicity, the pulses corresponding to the information.

In accordance with another embodiment of the apparatus of the present invention, the control unit has a limited validity time period, whereby after the limited validity time period has elapsed following receipt of the information by the control unit, the current feeding means reduces the current fed to the heating element to a predetermined value.

In accordance with another embodiment of the apparatus of the present invention, the control unit includes logic means, and the current feeding means includes switch means, the logic means, the switch means and the communication member comprising an integrated circuit. Preferably, the logic means, the switch means and/or the communication member are disposed on a common silicon chip.

In accordance with the present invention, a vehicle has also been devised including the above apparatus in which the external operating unit comprises a single silicon chip including all of the logic functions for programming the generation of the information.

In accordance with another aspect of the present invention, a method has been devised for heating a vehicle seat including a heating element for heating the vehicle seat and a control unit connected to the heating element for feeding a current to the heating element, the method comprising detecting the temperature created by the heating element, feeding the current to the heating element if the detected temperature is less than a predetermined desired temperature, and transferring information to the control unit from an external operating unit including generating the information based upon the state of at least one functional member utilizing programmed logic and transmitting the information to the control unit by means of programmed functions. In a preferred embodiment, the method includes generating the information based on data relating to the design of the vehicle seat, and the information relates to the predetermined desired temperature, and the method includes transferring the information in the form of a plurality of pulses corresponding to the predetermined desired temperature. Preferably, the method includes decreasing the current to the heating element after a limited validity time period elapses.

In accordance with one embodiment of the method of the present invention, the method includes transferring additional information relating to the condition of the heating element from the control unit to the exterior operating unit, and including indicating receipt of the additional information and the condition of the at least one functional unit.

In accordance with another embodiment of the method of the present invention, the method includes transferring additional information relating to errors in the control unit and components connected to the control unit from the control unit to the exterior operating unit.

In accordance with another embodiment of the method of the present invention, the method includes transferring the additional information from the control unit to the exterior operating unit in the form of at least one pulse and in accordance with a periodical sequence controlled by the control unit. Preferably, the method includes indicating each period of the periodical sequence with a start pulse transferred from the control unit.

In accordance with another embodiment of the method of the present invention, each period of the periodical sequence has a duration corresponding to a predetermined first time interval, and the method includes transferring the additional information from the control unit to the exterior operating unit during a second predetermined time interval, and the transfer of the information from the external operating unit to the control unit takes place during a third predetermined time interval. In a preferred embodiment, the method includes controlling the second and third predetermined time intervals by the control unit.

In accordance with another embodiment of the method of the present invention, the method includes controlling the second and third predetermined time intervals by the first predetermined time interval, and calculating the second and third predetermined time intervals in the exterior operating unit.

In accordance with another embodiment of the method of the present invention, the second predetermined time interval comprises from about 10% to 30% of the first predetermined time interval and the third predetermined time interval comprises from about 70% to 90% of the first predetermined time interval.

In accordance with another embodiment of the method of the present invention, the method includes interrupting the feeding of the current to the heating element if the plurality of pulses is outside of a predetermined range.

In accordance with another embodiment of the method of the present invention, the method includes setting a device including a flip-flop, a switch, a register or a counter to zero if the plurality of pulses is outside of a predetermined range.

In accordance with another embodiment of the method of the present invention, the method includes transmitting the information serially through a transmission cable between the control unit and the exterior operating unit.

The apparatus according to the present invention is intended for heating a vehicle seat which comprises a heating element which is connected to a control unit. The control unit comprises current feeding means for feeding a current through the heating element for the heating thereof. Furthermore, a temperature sensor is connected to the control unit for detection of the temperature created by the heating element, and wherein the control unit is adapted for feeding the current if the measured temperature is lower than a predetermined desired temperature. The control unit also comprises a communication unit for receiving information from an external operating unit by means of a transmission channel for the transfer of the information. In accordance with the present invention, the operating unit is connected to at least one functional unit for operating the control unit by means of the transferred information. In this regard, the operating unit comprises programmed logic functions for generating the information, at least depending on the state of the functional unit, and programmed functions for transmitting the information to the communication unit.

The operating unit used in accordance with the present invention allows for a simplified device and a simplified method for heating a vehicle seat. By means of the present invention, an economically advantageous solution is provided due to the fact that the operating unit can be manufactured from relatively low-cost, standard electronic components in a highly compact design, and can thereafter be programmed in order to provide the necessary functions, for example, for the vehicle type or vehicle seat in question.

The apparatus according to the present invention preferably operates entirely standing alone with respect to a central computer unit or the like in a motor vehicle, and consequently does not require any particular adaption of such a computer unit. The apparatus and the method according to the present invention is based on a modular concept in which a high degree of flexibility is obtained by means of a few standardized and uncomplicated electronic components.

According to one advantageous embodiment of the present invention, the information comprises information related to the desired temperature, wherein the operating unit is arranged to generate the information based on data stored in the operating unit related to the design of the vehicle seat.

The apparatus according to the present invention provides a very high degree of reliability, due to the fact that most of the components forming part of the invention can be integrated on a few integrated circuits.

BRIEF DESCRIPTION OF THE DRAWINGS

The present invention will be more fully appreciated with reference to the following detailed description, which, in turn, refers to the appended drawings, in which.

DETAILED DESCRIPTION

Figure 1:
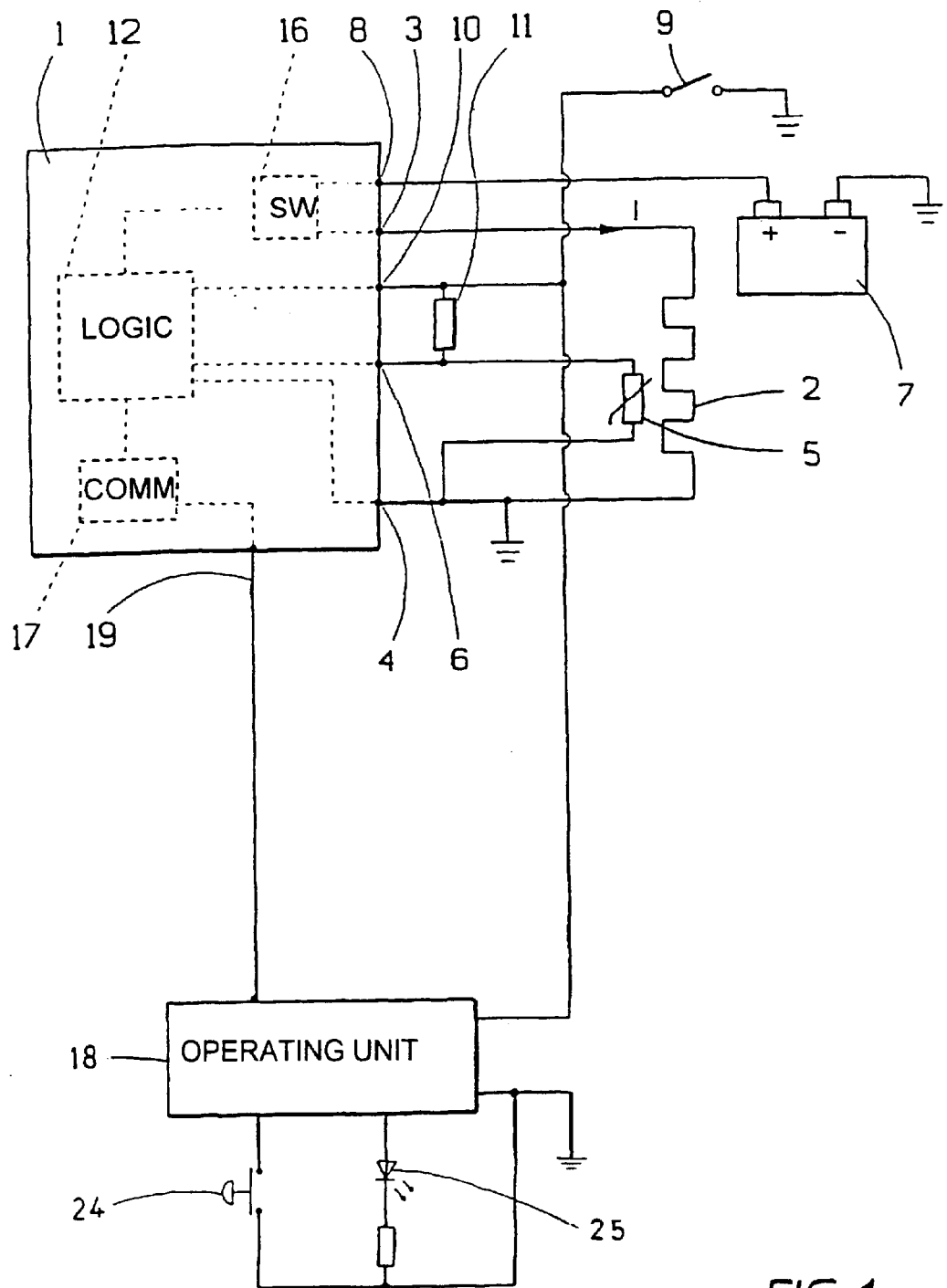
FIG. 1 is a circuit diagram of apparatus according to one embodiment of the present invention.

Referring to the Figures, in which like reference numerals refer to like elements thereof, FIG. 1 shows the principle of a circuit diagram of a device according to a first preferred embodiment of the present invention. According to this embodiment, the invention is intended to be utilized in connection with electrically heatable vehicles seats in vehicles. The figure shows in principle a control unit 1, the internal components and connections (which will be described in detail below) of which are shown with broken lines. The figure does not show all of the components of the control unit 1, but only those parts which are necessary for the understanding of the present invention.

The control unit 1 is arranged to feed a certain current I through a heating element 2. This heating element 2 is, as such, of an essentially known type, and consists of an electrical conductor which with its electrical resistance forms a heating coil. The heating element 2 is arranged inside a vehicle seat (not shown), preferably in its seat cushion. In principle, the heating element 2 can also be placed in the back-rest of the vehicle seat. Although the figure shows only one heating element 2, it is possible to connect several such elements to the control unit 1, for example in the form of a separate heating element for the seat cushion of the vehicle seat and a heating element for the back-rest of the vehicle seat. In cases where more than one heating element is used, these can be connected to the control unit either in parallel or in series.

As shown in FIG. 1, the heating element 2 is connected to the control unit 1 by means of two connections, 3 and 4, respectively, of which the latter is also connected to ground by means of a connection in the vehicle chassis.

In connection with the heating element 2, there is arranged a temperature sensor 5 which is electrically connected to the control unit 2 by means of the above-mentioned grounded connection 4 and a further connection 6. The temperature sensor 5 preferably consists of a thermistor of the NTC ("Negative temperature coefficient") type, which presents a temperature dependent resistance RT which corresponds to the temperature T which is present in the vicinity of the heating element 2. The detection using the temperature sensor 5 will be described in detail below.

There is also a current source 7 connected to the control unit 1 by means of a further connection 8. The current source 7 preferably consists of the starting battery of the vehicle. The system also comprises an on/off switch 9, which preferably is integrated in the ignition lock (not shown) of the vehicle. The switch 9 is connected to a further connection 10 of the control unit 1. The control unit 1 is arranged to be able to be activated and thus permit heating of the heating element 2 when the switch 9 is closed.

A resistor 11 with a predetermined resistance $R_{set}$ is connected between the connection 10, to which the switch 9 is connected, and the nongrounded connection 6, to which the temperature detector 5 is connected. As will be described in detail below, the resistor 11 is intended to be utilized in the temperature control of the heating element 2.

The design and main functions of the control unit 1 will now be described. The control unit 1 comprises a logic part 12 which preferably is computer based, but which can also consist of known electronic circuits. The logic part 12 is connected to the above-mentioned connections, 4, 6 and 10, and is arranged to detect the prevailing temperature T, of the temperature sensor 5. This detection uses a measuring bridge of the type which is principally shown in FIG. 2. The measuring bridge is of the Wheatstone-bridge type, and comprises the resistor 11 and the temperature sensor 5, which have the resistances $R_{set}$ and $R_T$, respectively. The measuring bridge furthermore comprises two further resistors, 13 and 14, respectively, which are preferably integrated components in the logic part 12, but which are not shown separately in FIG. 1. The resistors, 13 and 14, have the resistances $R_{13}$, $R_{14}$, respectively.

Figure 2:
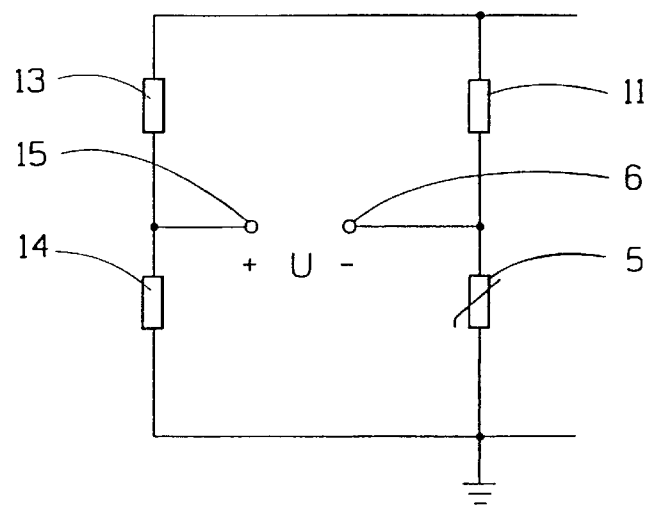
FIG. 2 is a schematic reproduction of a measuring bridge which is utilized when measuring temperature according to the present invention.

The measuring bridge furthermore comprises (as shown in FIG. 2) two connections, between which there is a certain voltage U. One of these connections corresponds to the connection 6 of FIG. 1, while the other connection 15 is an integrated part of the logic part 12. The logic part 12 is arranged to measure the voltage U when detecting the temperature T of the temperature sensor S. In case of balance in the measuring bridge, i.e., when the voltage U equals zero, the single unknown resistance, i.e., the resistance $R_T$, of the temperature sensor 5 can be computed using known formulae. In this manner, the logic part 12 can compute a value of the resistance, $R_T$, which in turn can be converted to a value of the current temperature T.

With renewed reference to FIG. 1, it can also be seen that the control unit 1 comprises a switching unit 16 which, depending on signals from the logic part 12, feeds the current I through the heating element 2. The switching unit 16, which is connected to the above-mentioned connections, 3 and 8, is preferably based on a MOSFET-transistor, which is a semi-conductor component which in an effective manner can deliver large currents from the current source 7 to the heating element 2.

The logic part 12 is thus arranged to determine a value of the prevailing temperature T. If the temperature T falls below a predetermined desired value $T_B$, which corresponds to a certain desired temperature on the surface of the seat of the vehicle, and which in general is determined by the choice of the resistances, $R_{13}$, $R_{14}$, and $R_{set}$, and by the basic resistance of the thermistor 5, the logic part 12 will control the switching unit 16 to deliver the current I to the heating element 2. When the desired value $T_B$, is reached, the logic part 12 interrupts the feeding of current by means of the switching unit 16 to the heating unit 2.

The control unit 2 also comprises a communication unit 17. The purpose of the unit is primarily to ensure that the desired information, preferably related to the desired value $T_B$, for the temperature control of the heating element 2 is transferred to the control unit 1 from an "intelligent" operating unit 18 by means of a transmission channel 19.

According to the present invention, and the first embodiment thereof, the "intelligent" operating unit includes an external electronic operating unit 18, the operation of which is controlled by means of the above-mentioned switch 9. The operating unit comprises a programmable microprocessor (not shown) with a permanent memory, preferably of the EPROM type. The operating unit 18 is connected to at least one functional unit 24 for operating the control unit 1 by transferring information from the operating unit 18 to the communication unit 17.

The term functional unit is intended to describe various kinds of switching functions and the like which for example correspond to On/Off switches or the like in a conventional system. In the first embodiment, the operating unit 18 comprises only one functional unit 24, more precisely in the form of an Off/On switch with an indicator function in the form of a light emitting diode circuit 25. As is apparent from FIG. 1, the operation of the operating unit 18 is controlled by means of the above-mentioned switch 9.

Furthermore, the operating unit 18 comprises programmed logic functions for generating the information intended to be transferred to the communication unit 17. In this regard, generation of the information is carried out at least depending on the state of the functional unit 24. The operating unit 18 also comprises programmed functions for transferring the information to the communication unit 17.

Consequently, the operating unit 18 is arranged in a manner so that the information which is delivered to the control unit 1 depends on the position of the switch 24. If, for example, the switch 24 is in its "Off" position, the information transferred to the communication unit 17 will correspond to a value which in turn corresponds to the fact that no current is fed through the heating element 2. Furthermore, the logic part 12 of the control unit 1 is preferably arranged so as to supply information which in turn corresponds to the operating unit 18 activating, alternatively shutting off, the light emitting diode circuit 25 depending on the prevailing position of the switch 24.

According to the first embodiment, a pull-up resistance (not shown) is furthermore arranged integrated with the control unit 1. More precisely, this resistance is arranged as a terminating resistor on the transmission channel 19.

Figure 4:
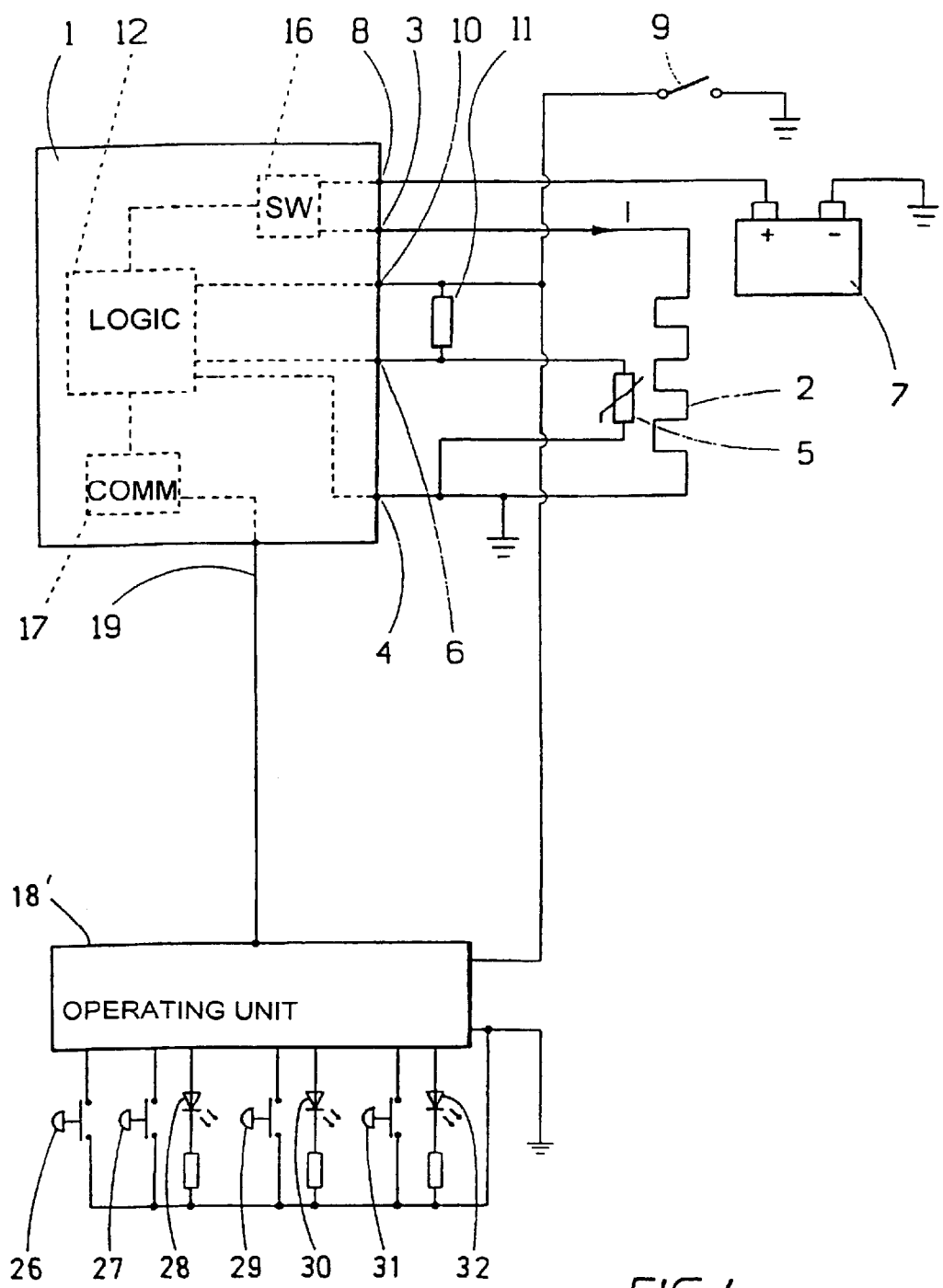
FIG. 4 is another circuit diagram of apparatus according to another embodiment of the present invention.

FIG. 4 shows a second preferred embodiment of a device according to the present invention. According to this embodiment, the device also comprises a control unit 1 of the same type as the first embodiment.

According to the second embodiment, the control unit 1 communicates with an operating unit 18' of a type which is characteristic for the present invention, the communication also in this embodiment taking place by means of a transmission channel 19 of a type which is similar to the first embodiment. According to the second embodiment, the information being transferred from the operating unit 18' also comprises information related to the desired set temperature. In this regard, the information is generated by means of the operating unit 18' based on data stored in the operating unit 18', which data is related to the design of the vehicle seat.

According to the second embodiment, the operating unit 18' is connected to a considerably more complex configuration of switches (functional units) than the embodiment shown in FIG. 1, i.e., Off/On, Off/Low/Medium/High power, 26, 27, 29, and 31, and having indicators in the form of light emitting diode circuits, 28, 30, and 32, for the Low/Medium/High functions.

All transfer of information between the control unit 1 and the operating unit, 18, 18', is carried out by means of the transmission channel 19, which is preferably in the form of an electric cable.

Figure 3:
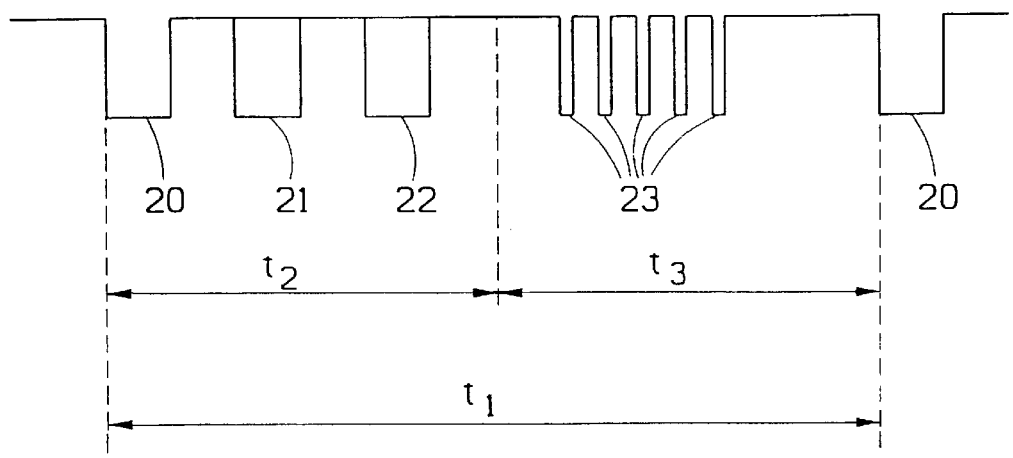
FIG. 3 is a schematic representation showing how data transfer according to the present invention is carried out.

As shown in FIG. 3, the transfer of information between the control unit 1 and the operating unit 18, 18' is controlled according to a periodic sequence with a certain predetermined period $t_1$. The transfer of information is based on the principle of transferring information which corresponds to actuating or interrupting a functional unit, 24, 26, 27, 29, and 31, or preferably corresponds to a particular desired value of the set value temperature $T_B$, from the operating unit, 18, 18', to the control unit 1. Preferably, there is also a transfer of information in the opposite direction, i.e., from the control unit 1 to the operating unit 18, 18'. This additional information from the control unit 1 can suitably comprise status information. During the total period of time $t_1$, transfer takes place from the control unit 1 to the operating unit, 18, 18', during a certain period of time $t_2$, whereas transfer from the operating unit, 18, 18', to the control unit 1 takes place during another period of time $t_3$.

FIG. 3 thus shows a certain period for the transfer of information. According to present invention, the transfer of information is initiated by a start-bit 20 being transferred from the control unit 1 to the operating unit, 18, 18'. To this end, the communication unit 17 comprises an oscillator circuit (not shown) which is known per se and which is arranged to be able to periodically emit pulses by means of the connection 19. The operating unit 18; 18' furthermore comprises, in a known manner, a detection circuit (not shown) for the detection of pulses by means of the connection 19. The transfer of a start-bit 20 from the control unit 1 initiates a certain period, and indicates that the control unit 1 is ready for operation, and that feeding of current to the heating element 2 can take place.

Subsequent to the transfer of the start-bit 20, there is, where used, a transfer of one or two status bits, 21 and 22, respectively, from the control unit 1. The first status-bit 21 will be transferred if the heating element 2 is "active," i.e., if there is feeding of current to the heating element 2. In this case, a negative pulse is thus transferred, as indicated in the drawing. The second status-bit 22 will furthermore be transferred (in the form of a negative pulse) if there is a malfunction in the heating element 2. Examples of malfunctions which might occur are that some part of the heating element 2 has been short-circuited, or that the conductor which constitutes the heating element 2 has been broken. The start-bit 20 and the two status-bits, 21 and 22, can thus be transferred during a time interval 12 which is defined in advance, and thus deliver information regarding the current status of the heating element 2 to the operating unit, 18, 18'. The transfer of the bits, 20, 21, and 22, is asynchronous, i.e., the pulses are counted by the operating unit, 18, 18', which thus constitutes the receiving side.

The next phase of a particular period preferably constitutes the transfer of a desired set value $T_B$ for temperature control of the heating element 2. This desired value is transferred from the operating unit, 18, 18', to the control unit 1. To this end, a transfer of a number of pulses 23 from the operating unit, 18, 18', takes place during the period of time $t_3$. To be precise, the transfer takes place by means of the connection 19 and the communication unit 17 to the logic part 12 (see FIG. 2). Furthermore, the communication unit 17 is also equipped with a detection circuit (not shown) for counting the number of pulses 23. According to the present invention, the number of pulses 23 preferably corresponds to a certain desired temperature value $T_B$ for the temperature control of the heating element 2. By way of example, FIG. 3 shows five pulses 23 being transferred. This might correspond to a desired value $T_B$ which, for example, can amount to 35° C., which in turn corresponds to a certain desired temperature on the surface of the vehicle seat. If, for example, a desired value of 36° C. is desired, six pulses 23 can for example be transferred.

The desired value $T_B$ is transferred to the logic part 12 in the control unit 1. With reference to FIGS. 1 and 2, it can now be seen that a given desired value $T_B$ corresponds to a certain expected resistance $R_T$ of the temperature sensor 5. This corresponds to the logic part 12 changing the values of the resistances, $R_{13}$ and $R_{14}$, which cause balance in the measuring bridge (see FIG. 2) at the prevailing desired temperature. This can be done by means of switching transistors (not shown) in the logic part 12 which switch between different resistance values in a resistance ladder (not shown). The resistance $R_{set}$ of the resistor 11 is not affected by which desired value $T_B$ is transferred. When the correct temperature has been reached, the resistance $R_T$ of the temperature sensor 5 will be of such a magnitude that balance is reached in the measuring bridge. This corresponds to the desired value $T_B$ having been reached.

Consequently, the operating unit, 18, 18', is suitably arranged to deliver information regarding a desired set temperature value $T_B$. In this manner, a correct control of the heating element 2 is obtained regardless of, for example, the upholstery of the vehicle seat used. The operating unit, 18, 18', can already when manufacturing the vehicle be provided with information regarding the type of seat, which in turn gives accurate information regarding prevailing desired values. In this regard, compensation for example for different types of upholstery for the vehicle seat in question can be effected.

The logic unit 12 is arranged to also detect the case where no pulse 23 at all is transferred during the period of time $t_3$. This is interpreted as a "reset" signal by the logic part 12, and causes any ongoing current feeding to the heating element to cease. Furthermore, this preferably leads to the entire logic part 12 being set to zero, i.e., flip-flops, switches, registers and counters are set to zero. For example, error flip-flops which detect shortcircuits in the heating element 2 are set to zero. In this way, intermittent malfunctions can be detected. Preferably, the system is also shut off, thereby causing any heating to be ceased, if there is reception of too many pulses, i.e., a number of pulses which exceeds the highest possible desired temperature.

As can be understood from the above description, the communication between the operating unit 18; 18' and the control unit 1 is of the serial kind. This means that only one connection is necessary between the operating unit, 18, 18', and the control unit 1, which leads to a considerably more simple wiring and which in turn reduces the costs in connection with the invention.

The duration of the periods of time, $t_1$, $t_2$ and $t_3$, may vary, and depends, among other things, on how the oscillator circuit in the communication unit 17 is designed. Preferably, a period length $t_1$ is used (i.e., the time between two start pulses 20) which is of the order of size of about 600 to 1000 ms, the period of time $t_2$ being about 100–200 ms and the period of time $t_3$ being about 500–800 ms. In this way, the period of time $t_2$ constitutes approximately 10–30% of the total period of time $t_1$, while the period of time $t_3$ constitutes about 70–90% of an entire period. The operating unit, 18, 18', detects the start of a certain period by detecting the start-bit 20. The operating unit, 18, 18', can also compute the period of time $t_1$ by measuring the time which elapses between two start-bits 20. By knowing during which part of the period of time ti information regarding the status of the heating element is expected to be received, the pulses, 21 and 22, can be detected. Subsequent to this, a certain number of pulses 23 can be transferred during the period of time $t_3$. This means that the operating unit, 18, 18', does not necessarily have to be synchronized with the communication unit 17.

The logic part 12 is preferably arranged so that data which is received from the operating unit, 18, 18', i.e., data which suitably corresponds to a particular desired set value $T_B$ for the above-mentioned temperature control, is given a limited validity time. This corresponds to the fact that data transferred to the logic part 12 can only be utilized for temperature control of the heating element during a certain limited period of time. This maximum period of time can vary, but is preferably set to a value $t_{max}$ which corresponds to a few periods (having the period time $t_1$) according to the sequence shown in FIG. 3. If the logic part receives a certain desired value $T_B$ and subsequently does not receive any new set value within a time period which corresponds to said value $t_{max}$ the logic part 12 will interrupt the feeding of current to the heating element 2 (alternatively decrease the current feeding sharply, to a predetermined level). In this manner, possible erroneous data being transferred to the logic part 12, for example as a consequence of possible errors which arise in the transmission channel 19 or in the transfer of data, does not give rise to an erroneous desired value being used for a considerable time for the temperature control of the heating element 2. This is obviously an advantage as regards safety related to the invention, which can be utilized so as to prevent an erroneous heating of the heating element 2.

The components forming part of the control unit 1 can, using modern technology, be integrated into one single application specific integrated circuit (ASIC), which provides a very high reliability of the invention. In so doing, the communication unit 17, the logic part 12 and the switching unit 16 are preferably arranged on the same silicon chip. Alternatively, the various circuits can be assembled on separate silicon chips but in the same circuit, i.e., in the same capsule.

Also the operating unit, 18, 18', is preferably constituted by a single silicon chip on which all the logic functions for the generation of information 23 which is intended to be transferred to the communication unit 17 has been programmed.

The operating unit, 18, 18', being used according to the present invention is connected during its assembly, or is provided during the manufacturing thereof, with suitable control knobs, buttons or the like, so as to influence the different functional units, 24, 26, 27, 29, and 31.

Furthermore, the operating unit, 18, 18', can be connected to, or may during the manufacturing thereof be equipped with, a suitable display unit such as for example a series of light emitting diodes (for example the light emitting diode circuits, 25 and 28, 30, and 32, respectively). Alternatively, the control knobs or buttons being connected to the operating unit, 18, 18', for the different functional units, 24, 26, 27, 29, and 31, can be provided with a suitable temperature scale.

The present invention is not limited to that which has been described above, but various embodiments are possible within the scope of the appended claims. For example, different kinds of temperature sensors can thus be utilized, for example thermistors with a negative or positive temperature coefficient. An existing temperature sensor in the vehicle which is used for heating the compartment can also, in principle, be used. The switching unit 16 can furthermore be based on, for example, MOSFET or relay technology.

The information intended to be transferred from the control unit 1 to the operating unit, 18, 18', (according to the above-mentioned embodiments the corresponding bits, 20, 21 and 22) can, as mentioned above, constitute status information, that is, information describing the condition of the heating element 2. Furthermore, this transferred information can constitute diagnostic information, i.e., information defining whether an error has occurred for example on the heating element 2, the temperature sensor 5 or the control unit 1, or if possible interruptions or short-circuits are present. Such status information can preferably be indicated by means of light emitting diodes being connected to the operating unit 18; 18', or on a simple indicator unit of other suitable type, such as an LCD display.

It should be noted that the present invention can also be utilized in the case where no start and status information (i.e., bits, 20, 21 and 22) is transferred from the control unit 1. This corresponds to the existence of one-way communication from the operating unit, 18, 18', to the control unit 1. The minimum of information which must be transferred from the operating unit, 18, 18', is a series of pulses 23 which is transferred within a certain interval of time and which indicates the condition of a functional unit, 24, 26, 27, 29, and 31, and suitably also a desired set value $T_B$ for the temperature control. Furthermore, said desired value $T_B$ does not necessarily have to be transferred in a manner in which the number of pulses determines a particular temperature value. Alternatively, coded signals may be transferred, wherein a particular digital word corresponds to a given temperature value.

Embodiments in which compensation of the desired value is carried out in the operating unit, 18, 18', in such a manner that a certain addition $\Delta T_B$ is added to the original desired value $T_B$ are also possible. Due to this addition $\Delta T_B$, which is suitable if there is an abnormally thick upholstery or an abnormally long distance from the heating element to the surface of the seat, compensation takes place, so that the heating element as such is heated to a higher temperature than would have otherwise been the case. For the user who sits on the seat, no difference is perceived, i.e., the user perceives the "normal" temperature which corresponds to the original desired value $T_s$. This technology is described in the international patent application no. PCT/SE97/01171, filed by the applicant of the present application.

If status information or diagnostic information is transferred from the control unit 1, the number of information bits does not necessarily need to be two, but may vary depending on the information which is intended to be transferred from the control unit 1.

The connection 19 can consist of an electrical cable, an optical cable or a radio connection.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A device for heating a vehicle seat comprising:
   a. a heating element arranged in relation to the vehicle seat;
   b. a temperature sensor;
   c. a control unit connected to said heating element wherein said control unit comprises current feeding means to feed current through the heating element for the heating thereof, said temperature sensor connected to said control unit for detection of a temperature related to that of said heating element wherein said control unit is adapted for feeding said current if said detected temperature is lower than a predetermined desired temperature, and a communication unit; and
   d. an external operating unit wherein said communication unit receives data from said external operating unit via a transmission channel and said external operating unit is connected to at least one controllable functional unit for inputting to said external operating unit information relevant to the operation of said control unit, said external operating unit including programmed logic functions for generating said data at least depending on the state of said controllable functional units, and said external operating unit further including programmed functions for transmitting said data to said communication unit via said transmission channel, wherein said data comprises information related to said desired temperature, wherein said external operating unit is arranged so as to generate said data based on data stored in said external operating unit and being related to the design of said vehicle seat.

2. The device according to claim 1, wherein said at least one controllable functional unit includes a plurality of controllable functional units.

3. A device according to claim 1, wherein said communication unit is also adapted to transfer additional data to said external operating unit, wherein said external operating unit is arranged to receive and indicate said additional data and to indicate the condition of at least one of said functional units.

4. A device according to claim 3, wherein said additional data comprises information related to the operational condition of said heating element and/or said control unit.

5. A device according to claim 3, wherein additional data comprises a start pulse for initiating a periodical sequence during which data is transferred.

6. A device according to claim 1, wherein said control unit comprises an oscillator circuit for transfer of pulses of a given periodicity, which pulses correspond to said data.

7. A device according to claim 1, wherein said control unit is arranged so that received data related to said desired temperature is given a limited validity time, after which said feeding of current is decreased to a predetermined value.

8. A device according to claim 1, wherein said control unit comprises a logic part and a switch unit forming part of said current feeding means, wherein said logic part, said switch unit and said communication unit are arranged in the form of an integrated circuit.

9. A device according to claim 8, wherein said communication unit, said logic part and/or said switch unit are arranged on a common silicon chip.

10. A vehicle comprising a device according to any one of claims 1, 3, and 8, wherein said external operating unit is constituted by one single silicon chip on which all said logic functions for the generation of said data have been programmed.

11. A method for heating a vehicle seat, said method comprising:
   a. detecting a prevailing temperature in the vicinity of a heating element in a vehicle seat,
   b. operating a control unit connected to the heating element to feed a current through said heating element if said prevailing temperature is lower than a predetermined desired temperature; and
   c. transferring data to said control unit from an external operating unit via a transmission channel, wherein said external operating unit is connected to at least one controllable functional units for inputting information relevant to the operation of said control unit to said external operating unit, and said external operating unit comprising programmed logic functions which generate said data at least depending on the state of said functional unit further comprising programmed functions which transmit said data to said communication unit via said transmission channel, wherein said data comprises information related to said desired temperature, wherein said external operating unit is arranged so as to generate said data based on data stored in said external operating unit and being related to the design of said vehicle seat.

12. The device according to claim 11, wherein said at least one controllable functional unit includes a plurality of controllable functional units.

13. The method according to claim 11, wherein said data comprises information related to said desired temperature, wherein said external operating unit generates said data based on data stored in said external operating unit and related to the design of said vehicle seat, and that said data related to said desired temperature is transferred in the form of a series of pulses, the number of which corresponds to a value of said desired temperature.

14. The method according to claim 13, wherein said data related to said desired temperature is given a limited validity time, after which said feeding of current is decreased to a predetermined value.

15. The method according to claim 11, wherein also status data related to the operational condition of said heating element is transferred from the control unit to the external operating unit, wherein said external operating unit receives and indicates said additional data and indicates the condition of at least one of said functional units.

16. The method according to claim 15, wherein diagnostic information related to possible errors of said control unit and components connected thereto is also transferred from the control unit to the external operating unit.

17. The method according to claim 15, wherein said data is transferred in the form of at least one pulse and in accordance with a periodical sequence which is controlled by said control unit.

18. The method according to claim 17, wherein each new period is indicated by means of a start pulse which is transferred from said control unit.

19. The method according to claim 17, wherein said period has a duration which is equal to a predetermined first interval of time, wherein transfer of data from said control unit is carried out during a second interval of time and transfer of information from said external operating unit is carried out during a third interval of time.

20. The method according to claim 19, wherein said second and third intervals of time are controlled by said control unit.

21. The method according to claim 19, wherein the length of said second and third intervals of time are controlled by the duration of the preceding first interval of time and are calculated in said external operating unit.

22. The method according to claim 19, wherein said second interval of time constitutes 10–30% of said first interval of time and said third interval of time constitutes 70–90% of said first interval of time.

23. The method according to claim 13, wherein the number of pulses related to the desired temperature is within a predetermined interval which corresponds to different temperatures, wherein reception of too many or too few pulses by said control unit causes said current feeding to be interrupted.

24. The method according to claim 13, wherein the number of pulses related to said desired temperature is within a predetermined interval which corresponds to different temperatures, wherein reception of too many or too few pulses which is received by said control unit causes flip-flops, switches, registers and counters of said control unit to be set to zero.

25. The method according to claim 11, wherein said data is transferred serially via a transmission channel between the control unit and the external operating unit.

* * * * *

UNITED STATES PATENT AND TRADEMARK OFFICE
CERTIFICATE OF CORRECTION

PATENT NO.     : 6,664,518 B2
DATED          : December 16, 2003
INVENTOR(S)    : Tommy Fristedt It is certified that error appears in the above-identified patent and that said Letters Patent is hereby corrected as shown below:

Column 9,
Line 31, "Of" should read -- of --.

Column 13,
Line 17, "units" should read -- unit --.

Column 14,
Line 41, "is" should read -- are --.

Signed and Sealed this

Twenty-fourth Day of February, 2004

JON W. DUDAS
*Acting Director of the United States Patent and Trademark Office*